US008752587B1

(12) United States Patent
Bramble et al.

(10) Patent No.: US 8,752,587 B1
(45) Date of Patent: Jun. 17, 2014

(54) APPARATUS AND METHOD FOR PREVENTING ICE BLOCKAGE OF A SUMP PUMP DISCHARGE LINE

(75) Inventors: Curtis Bramble, Kansas City, MO (US); Otto W. Fleck, Kansas City, MO (US); Lowell Hickman, Riverside, MO (US)

(73) Assignee: Dry Basement, Inc., Kansas City, MO (US)

( * ) Notice: Subject to any disclaimer, the term of this patent is extended or adjusted under 35 U.S.C. 154(b) by 398 days.

(21) Appl. No.: 13/346,293

(22) Filed: Jan. 9, 2012

Related U.S. Application Data (60) Provisional application No. 61/431,279, filed on Jan. 10, 2011.

(51) Int. Cl.
*F16K 11/10* (2006.01)
*E02D 19/00* (2006.01)

(52) U.S. Cl.
USPC ............................. 137/883; 137/360; 52/169.5

(58) Field of Classification Search
USPC ............. 137/357, 360, 883; 52/302.7, 302.1, 52/169.5; 417/36
See application file for complete search history.

(56) References Cited

U.S. PATENT DOCUMENTS

| 4,949,626 | A | * | 8/1990 | Townsend et al. | 454/341 |
|---|---|---|---|---|---|
| 5,526,613 | A | * | 6/1996 | Simeone, Jr. | 52/12 |
| 5,584,147 | A | * | 12/1996 | Agee et al. | 52/16 |
| 5,746,254 | A | * | 5/1998 | Janesky | 138/32 |
| 6,601,607 | B1 | * | 8/2003 | Pratt | 137/357 |
| 6,766,620 | B2 | * | 7/2004 | Robbins | 52/169.5 |
| 7,815,795 | B2 | * | 10/2010 | Parks et al. | 210/167.1 |

* cited by examiner

*Primary Examiner* — John Fox
(74) *Attorney, Agent, or Firm* — Erise IP, P.A.

(57) ABSTRACT

An ice blocking apparatus for preventing ice blockage of a sump pump discharge line. The apparatus is mounted to an external wall of a building and includes a housing having lower and upper openings, a discharge line connection segment fluidly coupled with the sump pump discharge line, an expeller segment including lower and upper pipe segments fluidly coupled with discharge segment, and first and second doors pivotably mounted to the housing and covering the lower and upper openings of the housing. The lower pipe segment is fluidly coupled with the lower opening in the housing, and the upper pipe segment is fluidly coupled with the upper opening in the housing. When ice is not blocking the lower opening of the housing, fluid from a sump pump flows through the lower opening, and when ice is blocking the lower opening, fluid flows through the upper opening of the housing.

20 Claims, 6 Drawing Sheets

APPARATUS AND METHOD FOR PREVENTING ICE BLOCKAGE OF A SUMP PUMP DISCHARGE LINE

RELATED APPLICATIONS

This patent application claims priority benefit, with regard to all common subject matter, of earlier-filed U.S. Provisional Patent Application No. 61/431,279, filed Jan. 10, 2011, and entitled "APPARATUS AND METHOD FOR PREVENTING ICE BLOCKAGE OF A SUMP PUMP DISCHARGE LINE." The identified earlier-filed provisional patent application is hereby incorporated by reference in its entirety into the present application.

BACKGROUND

1. Field

Embodiments of the present invention are apparatus and methods for preventing ice blockage of a sump pump discharge line. More particularly, embodiments of the present invention provide an apparatus for securing to an external discharge line of a sump pump to prevent ice blockage at the discharge line.

2. Related Art

Buildings that employ a sump pump assembly commonly have a discharge line comprising a pipe or other conduit. The discharge line is connected at one end to the sump pump assembly, such as one internally housed in a building. An other end of the line, referred to herein as the "discharge end," discharges to a location external to the building. In many buildings, the line is fed to an opening formed in an external or outside wall of the building, and the discharge end of the line terminates at the opening in the building. Thus, water from the sump pump is discharged via the line to a location external to the building.

In cold weather climates, the water being discharged from the line has a tendency to freeze in and around the line. As the water freezes, it builds up ice in and around the discharge end of the discharge line at the opening in the building. The ice buildup becomes larger and larger until the opening at the discharge end is at least partially covered with ice. This ice buildup then adversely affects the operating efficiency of the discharge line. In some cases, the buildup will be so great that the discharge line is not operable to expel the water to the external location. For example, the ice may actually cover the discharge end of the line. As such, the water from the sump pump has nowhere to drain, which results in water damage to the building's basement where the sump pump is located and to the sump pump itself when pumping against an ice blockage.

SUMMARY OF THE INVENTION

Embodiments of the present invention solve the above-mentioned problems and provide a distinct advance in the art of apparatus for preventing ice blockage of a sump pump discharge line. Embodiments of the present invention provide an apparatus broadly comprising a housing having a hollowed interior and configured for mounting on an external wall of a building. The housing includes lower and upper openings formed in an externally facing wall of the housing. A discharge line connection segment is at least partially housed in the housing and is fluidly coupled with the sump pump discharge line. A generally U-shaped expeller segment is also housed within the housing and is fluidly coupled with or otherwise integral with the discharge line connection segment. The expeller segment includes lower and upper legs and a body disposed between the legs and in fluid communication with the legs. The upper leg is in fluid communication with the upper opening in the housing, and the lower leg is in fluid communication with the lower opening in the housing.

The apparatus also includes a covering having lower and upper doors pivotably mounted to the housing. The lower door is pivotable from an at rest position at least partially covering the lower opening in the housing, and to an operating position wherein the lower door is pivoted away from the lower opening in the housing. Similarly, the upper door is pivotable from an at rest position at least partially covering the upper opening in the housing, and to an operating position wherein the upper door is pivoted away from the upper opening in the housing.

A method of preventing ice blockage of a sump pump discharge line comprises two operating conditions. In a first operating condition, the lower opening of the housing is not blocked by ice, such that fluid exiting the discharge segment flows via gravity down and through the body of the expeller segment, to the lower leg of the expeller segment, and through the lower opening of the housing. In a second operating condition, the lower opening of the housing is blocked by ice, such that fluid cannot escape the lower opening of the housing, and upon the lower opening of the housing being blocked, fluid exiting the discharge segment flows to the upper leg of the expeller segment and through the upper opening of the housing.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiments of the present invention are an ice blocking apparatus 10 and method for preventing ice blockage at a sump pump discharge line, which extends from a sump pump assembly (not shown). Referring to the Figures and particularly FIGS. 1, 2, and 6, the apparatus 10 comprises a housing 12, a discharge line connection segment 14, a generally U-shaped expeller segment 16, and a covering 18. The ice blocking apparatus is coupled to an external or outside wall 20 of a building 22. A sump pump discharge line 24, without use of the apparatus 10 of the present invention, is fed to an opening formed in the external wall 20 of the building 22 (see, e.g., FIG. 6). With use of the apparatus 10 of embodiments of the present invention, the sump pump discharge line 24 is fed to the apparatus 10, wherein fluid discharged from the sump pump assembly exits the apparatus 10 to an exterior or outside of the building 22.

The housing 12 is generally hollow and broadly comprises lower and upper end walls 26,28, left and right side walls 30,32, a front wall 34, and a rear wall 36. The housing 12 is generally rectangular in shape when viewed from either of the left or right side walls 30,32. A flange 38 surrounds the rear wall 36 of the housing 12, and the housing 12 is secured to the building 22 such that the flange 38 is generally flush against the outside wall 20 of the building 22. In embodiments of the present invention, the housing 12 is secured to the building 22 via bolts or screws (not shown) drilled through the flange 38 and into the building 22. Other securement methods may be employed to the extent that the housing 12 is securely coupled to the outside wall 20 of the building 22.

Figure 1:
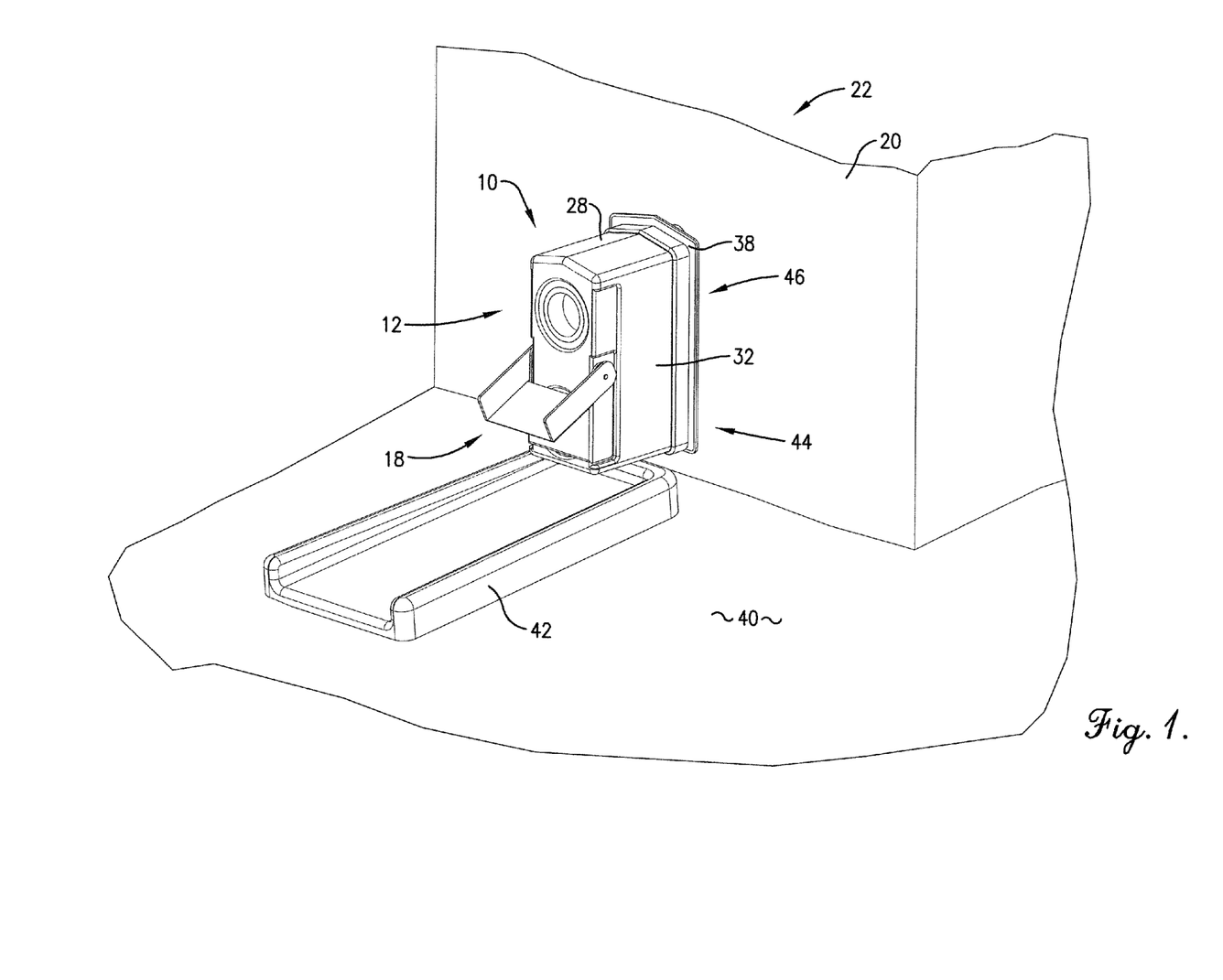
FIG. 1 is an environmental view of an apparatus for preventing ice blockage of a sump pump discharge line.

The housing 12 is made of ABS, aluminum, steel, or other suitable material that will withstand being located in an outside environment that may exhibit extreme temperature variances and that will likely receive rain and snow. The housing 12 may be a monolithic unit or may be formed of joined parts. Alternatively, the lower and upper end walls 26,28, the left and right side walls 30,32, and the front wall 34 may be a monolithic unit, and the rear wall 36 may be separated from the other walls. As best illustrated in FIG. 1, the housing 12 is mounted to the outside wall 20 of the building 22 close to (but not necessarily directly adjacent) the ground 40, such that fluid being expelled from the sump pump assembly and through the ice blocking apparatus 10 is fed to a splash block 42 located on the ground 40. In alternative embodiments, the lower portion 44 of the housing 12 may sit at ground level external to the building 22. A height of the housing 12 relative to the building 22 will be largely dependent on the height of the discharge line 24 relative to ground level.

Figure 6:
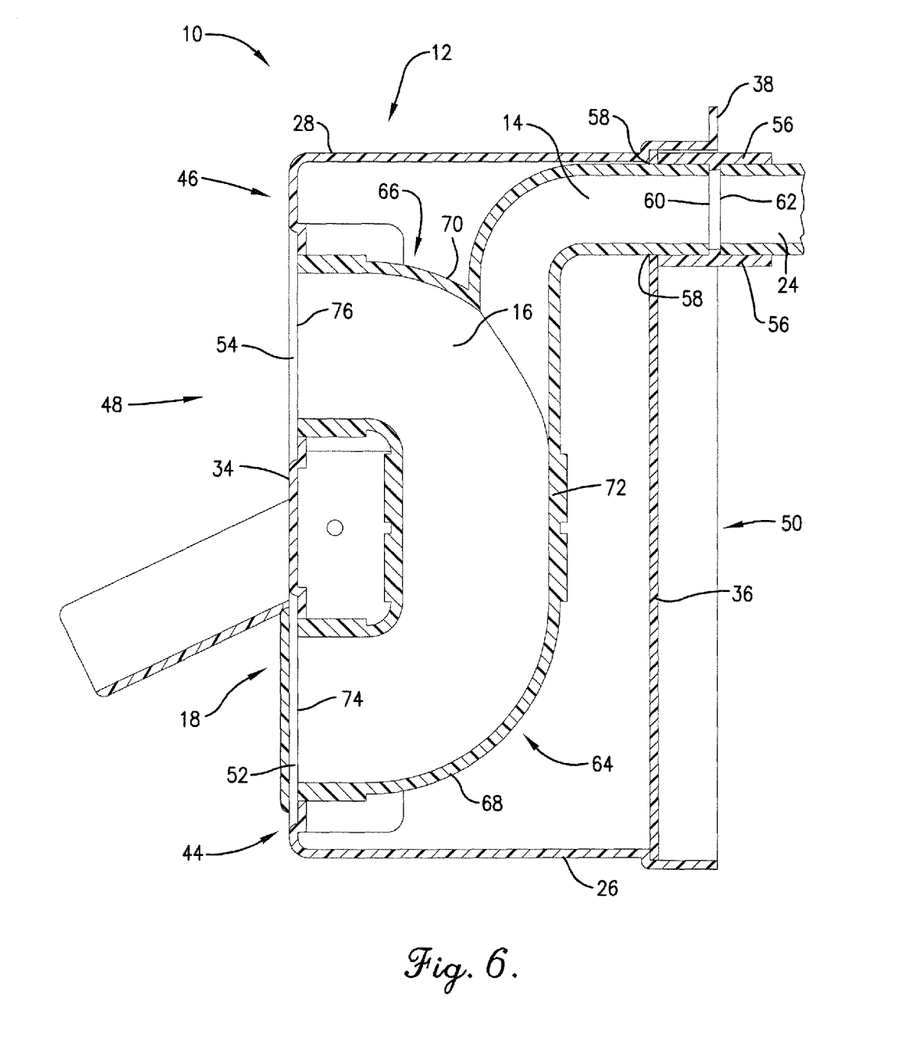
FIG. 6 is a vertical cross-sectional right side view through line 6-6 of FIG. 5 and particularly illustrating an expeller segment for expulsion of fluid from a sump pump assembly and to an outside environment.

Reference to "lower" and "upper" structural components will be made herein. Referring to FIGS. 1 and 6, a lower portion 44 of the housing 12 is closest to the ground, and an upper portion 46 of the housing 12 is opposite the lower portion 44. A front 48 of the housing 12 faces outwards away from the building 22, and a rear 50 of the housing 12 is proximal the building 22. The housing dimensions are approximately 5-20 inches in width or approximately 7-15 inches in width (as measured from the left to the right side walls 30,32 of the housing 12); approximately 5-30 inches in length or approximately 10-20 inches in length (as measured from the lower to the upper end walls 26,28 of the housing 12); and approximately 2-15 inches or approximately 5-10 inches in depth (as measured from the front to the rear walls 34,36 of the housing 12).

Figure 2:
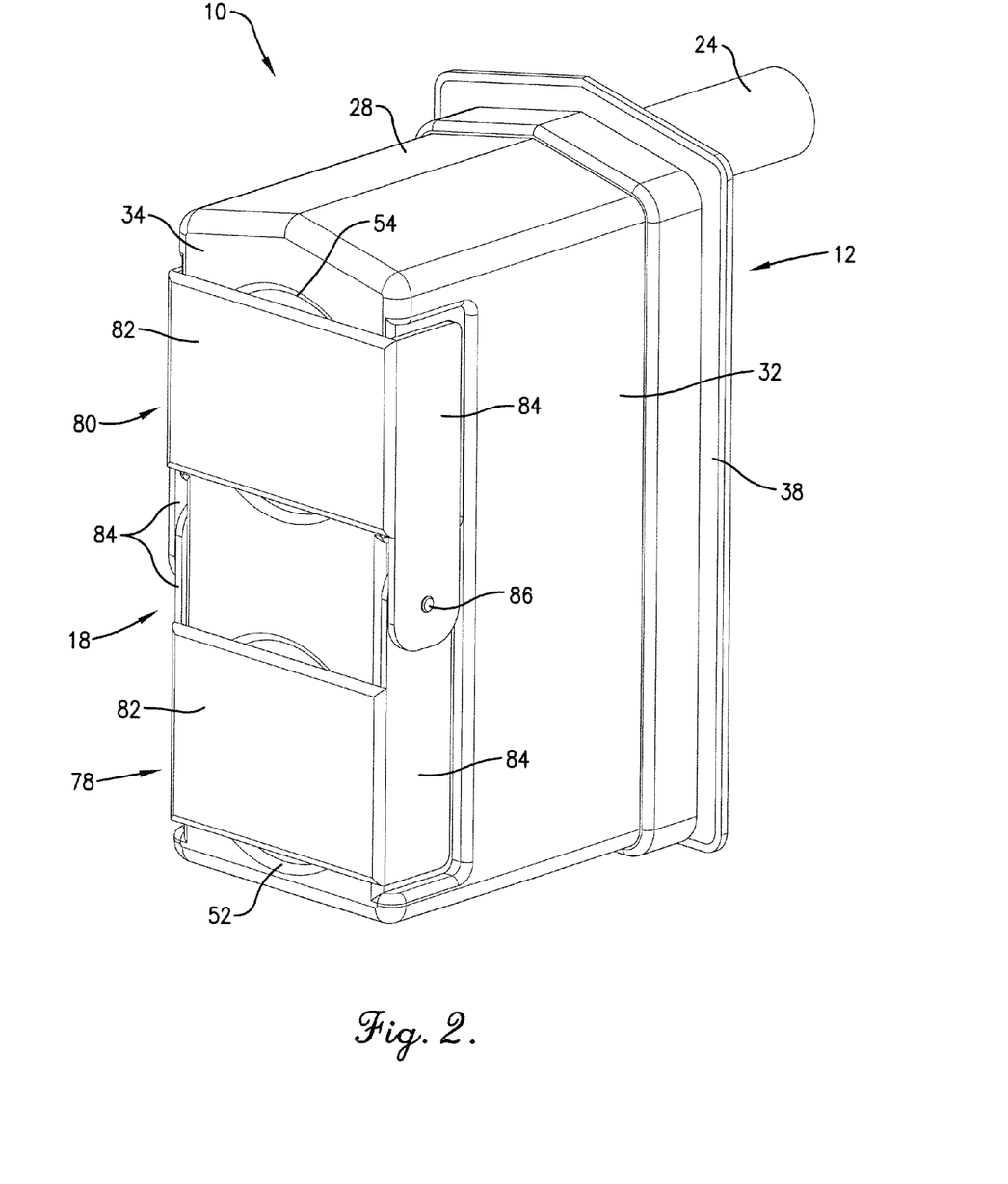
FIG. 2 is an isometric view of the apparatus of FIG. 1 and illustrating a covering comprising two pivoting doors.
Figure 3:
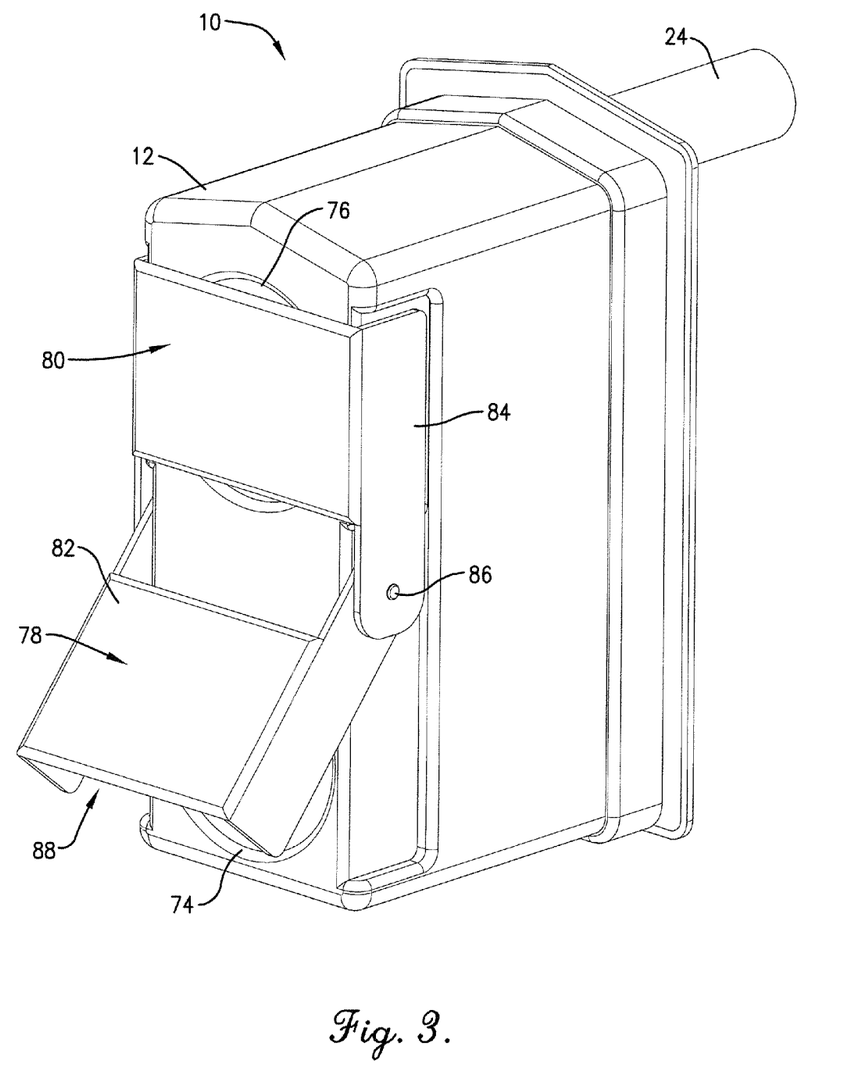
FIG. 3 is an isometric view of the apparatus of FIGS. 1 and 2 and illustrating a lower door pivoted outwards.

Lower and upper through openings 52,54 are formed in and through the front wall 34 of the housing 12, as best illustrated in FIGS. 2-3. Fluid from the sump pump assembly is expelled through the lower and upper openings 52,54, as discussed in more detail below. The lower and upper openings 52,54 are in fluid communication with the expeller segment 16, as also discussed in more detail below. The openings 52,54 are approximately the same size, although the openings could be different sizes. The openings 52,54 are also generally circular, although the openings could be other shapes. The openings 52,54 are slightly less that the width of the housing 12, although the openings could be substantially less than the width of the housing. In embodiments of the present invention, a width of the openings 52,54 is greater than or equal to approximately 50% the width of the housing 12, greater than or equal to approximately 65% the width of the housing, or greater than or equal to approximately 85% the width of the housing.

Turning now to FIG. 6, structure for fluidly joining the ice blocking apparatus 10 to the sump pump assembly is illustrated. The discharge line connection segment 14 of the apparatus 10 is housed within the housing 12 and is illustrated in fluid communication with the sump pump discharge line 24. Although various suitable joining means could be employed, embodiments of the present invention fluidly join the discharge line connection segment 14 of the apparatus 10 with the sump pump discharge line 24 via a joint connector 56. The joint connector 56 extends through a connection opening 58 formed in the rear wall 36 of the housing 12. The joint connector 56 is a short segment of pipe or other connecting structure having a slightly larger diameter than the discharge segment 14 of the apparatus 10 and the discharge line 24 of the sump pump assembly. Exposed or open respective ends 60,62 of each of the discharge segment 14 and discharge line 24 are fed through the joint connector 56, such that the discharge line 24 is in fluid communication with the discharge segment 14 of the apparatus 10. The joint connector 56 may be securely coupled to the segment 14 and line 24 via epoxy, mechanical fasteners, such as screws and bolts, or other suitable methods.

In embodiments of the present invention, the discharge line connection segment 14 and the expeller segment 16 are PVC pipes or other suitable piping. Similarly, the discharge line 24 of the sump pump assembly is also PVC piping.

Referring again to FIG. 6, the expeller segment 16 of the ice blocking apparatus 10 is housed within the housing 12 and is generally divided into a lower section 64 and an upper section 66. As noted above, the expeller segment 16 is generally U-shaped in vertical cross section, as illustrated in FIG. 6, to present a lower leg 68 at the lower section 64 of the expeller segment 16, an upper leg 70 at the upper section 66 of the expeller segment 16, and a body 72 disposed between and interconnecting the lower and upper legs 68,70. When the housing 12 is mounted to the building 22, the lower and upper legs 68,70 are generally parallel to each other and generally horizontal with respect to a plane of the ground and the lower end wall 26 of the housing 12. Additionally, the upper leg 70 is generally positioned above the lower leg 68. The expeller segment 16 is oriented such that a length of the body 72 is generally vertical and parallel with a longitudinal axis of the housing 12. As also noted above, the expeller segment 16 is piping, and the piping is cut off at the lower and upper legs 68,70, such that the lower leg 68 presents a lower opening 74 in fluid communication with the lower opening 52 of the housing 12, and similarly, the upper leg 70 of the expeller segment 16 presents an upper opening 76 in fluid communication with the upper opening 54 of the housing 12.

Even with the discharge line connection segment 14 and the expeller segment 16 housed within the housing 12, an internal volume of the housing is open, as best illustrated in FIG. 6. In embodiments of the present invention, the open internal volume of the housing 12 is filled with an insulting material, such as an insulating foam (not shown).

Referring now to FIGS. 2-5, the covering 18 of the apparatus 10 is illustrated. The covering 18 generally comprises lower and upper doors 78,80 pivotably secured to the housing 12 and configured to respectively cover the lower and upper openings 52,54 in the housing 12. As illustrated in FIG. 2, each of the doors 78,80 comprises a primary covering wall 82 and two arms 84 extending generally 90 degrees from the primary wall 82. The arms 84 are pivotably secured to respective left and right side walls 30,32 of the housing 12 via a screw, pin, or other suitable fastener 86 that allows for rotation of the door 78,80 relative to the housing 12.

Figure 4:
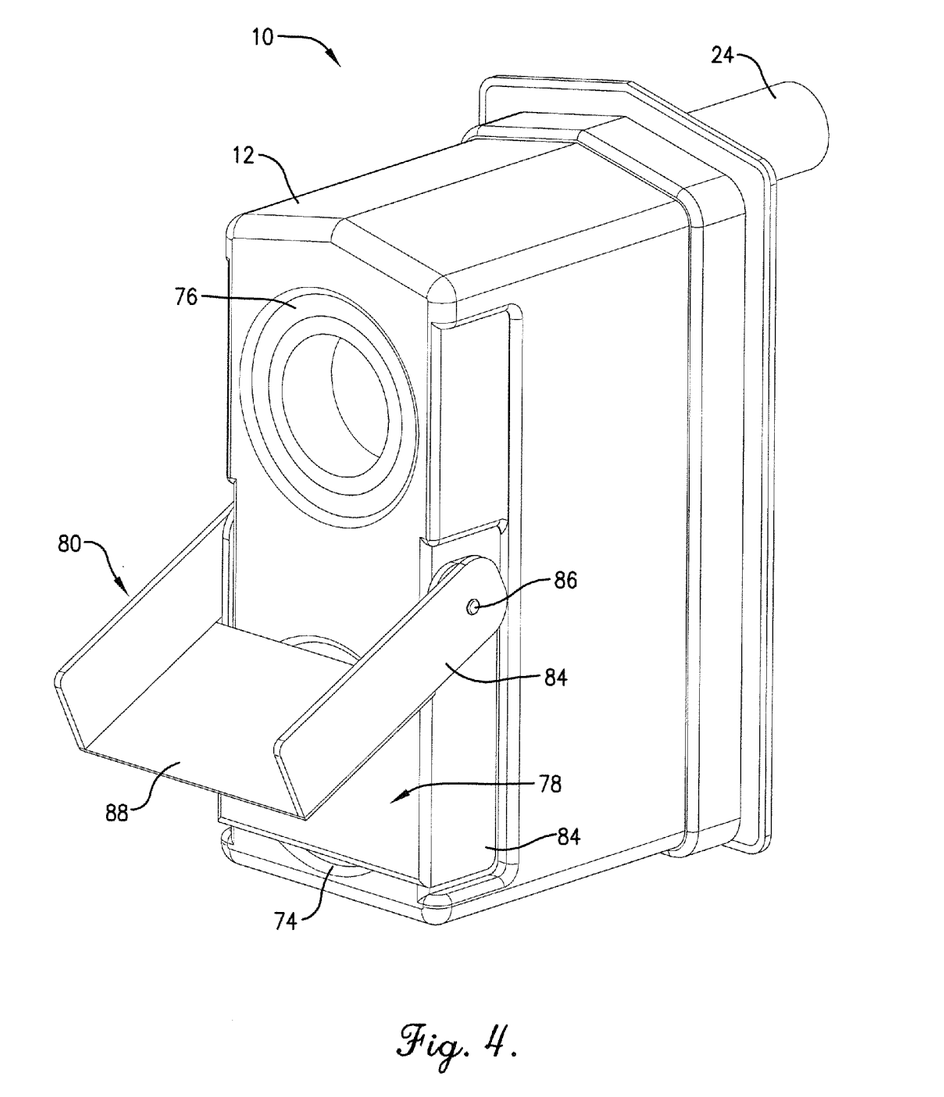
FIG. 4 is an isometric view of the apparatus of FIGS. 1 and 2 and illustrating an upper door pivoted outwards.
Figure 5:
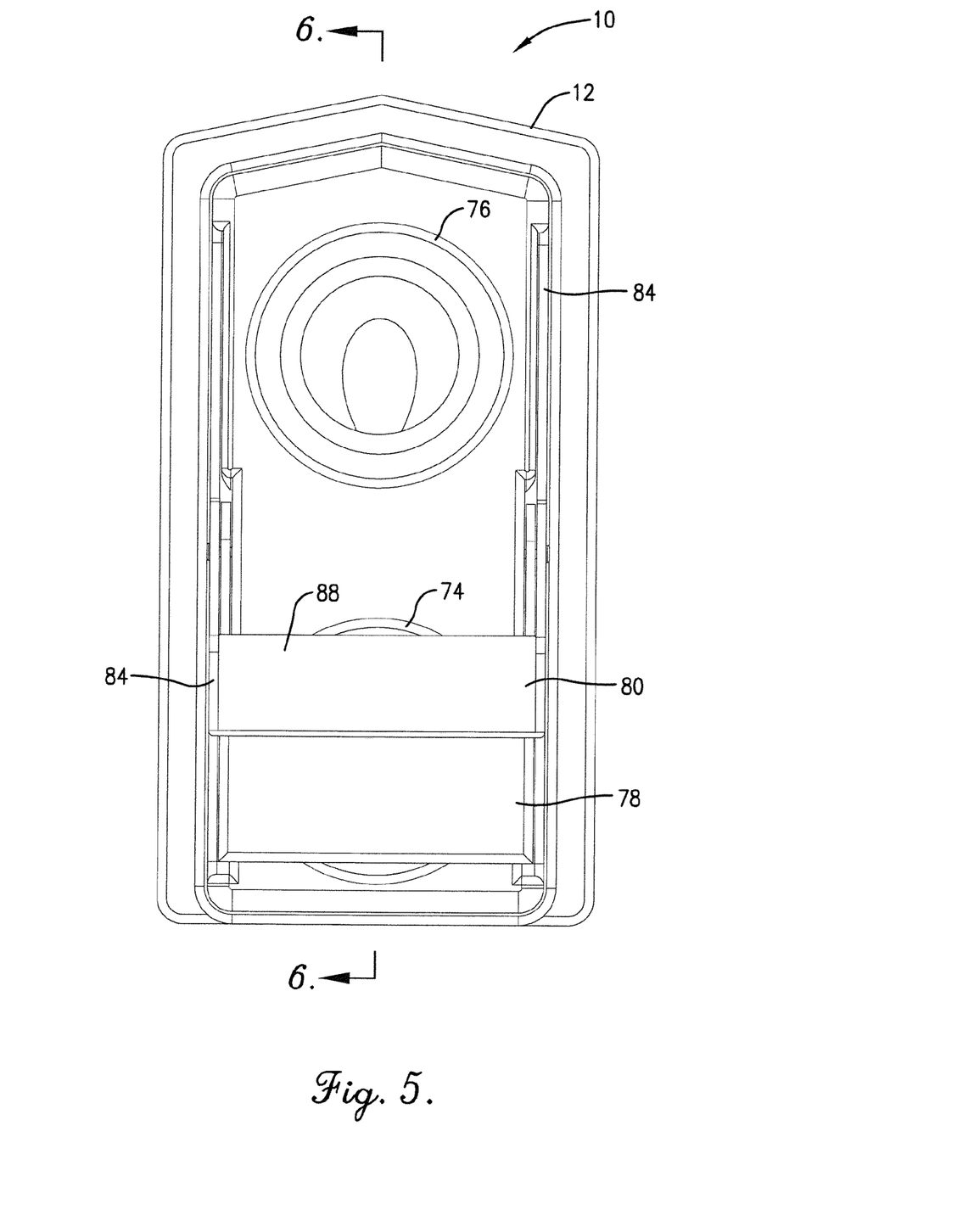
FIG. 5 is a front end view of the apparatus of FIG. 4 with the upper door pivoted outwards.

When the doors 78,80 are in their "at rest" position, an interior face 88 of the door (see FIG. 4) is substantially proximal to and/or generally flush against the front wall 34 of the housing 12. In such "at rest" position, as illustrated in FIG. 2, the primary wall 82 of each door 78,80 is substantially covering the respective lower and upper openings 52,54 of the housing 12. In contrast, in an "operating" position, the door 78,80 is pivoted outwards. FIG. 3 illustrates the lower door 78 pivoted outwards in an operating position, such that the interior face 88 of the lower door 78 is separated a distance from the front wall 34 of the housing 12 and the lower opening 52 of the housing 12 is exposed. Similarly, FIG. 4 illustrates the upper door 80 pivoted outwards, such that the upper opening 54 of the housing 12 is exposed. As explained in detail below, the doors 78,80 open to their operating position upon application of force against the interior face 88 of the primary wall 82 due to fluid moving through the lower and upper legs 68,70 of the expeller segment 16. In alternative embodiments of the present invention, the housing 12 or the doors 78,80 may include a stop (not shown) that prevents excessive rotation of the respective door beyond a certain angle.

Operation of the ice blocking apparatus 10 of embodiments of the present invention is now described. As discussed above, the apparatus 10 is secured to the outside wall 20 of the building 20. The discharge line connection segment 14 is first fluidly coupled with the discharge line 24 of the sump pump assembly via the joint connector 56. The discharge line connection segment 14 is in fluid communication with the expeller segment 16 of the apparatus. In embodiments of the present invention, the discharge line connection segment 14 and the expeller segment 16 are a single unit of piping, such that one monolithic segment of piping is coupled to the discharge line 24.

The rear wall 36 of the housing 12 is then secured to the outside wall 20 of the building 22. Alternatively, the rear wall 36 of the housing 12 is secured to the building 22 prior to fluidly coupling the discharge segment 14 with the discharge line 24. In even further alternatives, the discharge segment 14 is coupled to the discharge line 24 and the entire housing 12 is secured to the building 22 via bolts or screws through the flange 38. In yet further alternatives of embodiments of the present invention, the housing 12 does not include the rear wall 36, such that the outside wall 20 of the building 22 effectively serves as a rear covering for the housing 12.

Upon the housing 12 being secured to the building 22, fluid exiting the sump pump assembly flows through the discharge line 24 and to the discharge line connection segment 14 of the present invention. The fluid then drops, via gravity, through the body 72 of the expeller segment 16 and to the lower section 64 of the expeller segment 16. The fluid then drains through the lower leg 68 and lower opening 74 of the expeller segment 16. Upon a sufficient force of fluid exiting the lower opening 52 of the housing 12 and impacting the interior face 88 of the lower door 78 of the covering 18, the lower door 78 pivots from the at rest position, illustrated in FIG. 2, to the operating position, illustrated in FIG. 3. The fluid then drains through the lower opening 52 in the housing 12 and to the splash block 42.

Both of the doors 78,80 pivot to the operating position relatively easily, such that the fluid force necessary to push the doors open to the operating position is accomplished relatively easily. An exemplary force to open the doors 78,80 is approximately 1-30 psi or approximately 1-20 psi. Upon cessation of the fluid flow against the interior face 88 of the lower door 78 or, at the least, the fluid flow being substantially minimized, the lower door 78 will pivot or swing back to its at rest position generally flush against the front wall 34 of the housing 12 due to the force of gravity.

In a cold weather condition, ice begins to build from the ground 40 upwards to the housing 12. In particular, as fluid is drained through the lower opening 52 in the housing 12 or as mist or rain surrounding the housing 12 freezes, the fluid/mist/rain freezes and begins to build. In some circumstances, the ice buildup becomes so great that it may cover the lower opening 52 of the housing 12. In such an instance, the fluid discharged through the lower section 64 of the expeller segment 16 is backed up along the body 72 of the expeller segment 16. Because the upper section 66 of the expeller segment 16 is also in fluid communication with the body 72 and the discharge segment 14, the fluid then escapes through upper leg 68 of the upper section 66 of the expeller segment 16 and ultimately through the upper opening 76 of the housing 12.

Similar to the lower door 78, upon sufficient application of fluid force against the interior face 88 of the upper door 80, the upper door 80 pivots from its at rest position, illustrated in FIG. 2, to its open position, illustrated in FIG. 4. Fluid exiting the upper opening 54 in the housing 12 spills onto the splash block 42. In embodiments of the present invention, the fluid force necessary to open or pivot the upper door 80 is greater than the fluid force necessary to open or pivot the lower door 80. In even further alternative embodiments of the present invention, either or both of the lower and upper doors 78,80 are spring-mounted to the housing 12, such that the doors 78,80 automatically pivot to the at rest position upon the fluid force impacting the doors decreasing below a spring force of a spring (not shown), such as a coil or leaf spring, used in a spring-mounted assembly (not shown). In yet further embodiments of the present invention, if the upper door 80 is open and then the lower door 78 pivots open, the lower door 78 can knock the upper door 80 to the at rest or closed position.

Although the invention has been described with reference to the embodiments illustrated in the attached drawing figures, it is noted that equivalents may be employed and substitutions made herein without departing from the scope of the invention as recited in the claims. For example, instead of the expeller segment 16 as shown and described, a first pipe could be in fluid communication with the discharge segment 14 and the lower opening 52 of the housing, and a second pipe could be in fluid communication with the discharge segment 14 and the upper opening 54 of the housing. A mechanical or electrical valve could also be employed to direct fluid to one of the two pipes. In even further alternative embodiments, the doors 78,80 of the covering 18 could be electronically wired to raise or lower upon input of instructions.

In other embodiments of the present invention, the covering 18 may comprise one or more friction-fit plugs (not shown) instead of the doors 78,80. The plugs may be plastic or rubber plugs connected to the housing 12 via a chain or other leash. Either or both of the lower and upper openings 52,54 in the housing 12 could include a plug. The plug is frictionally fit into the respective lower and upper openings 52,54. When fluid begins to push against an interior face of the plug, the pressure of the fluid will eventually overcome the friction fit of the plug, thus pushing the plug outwards and allowing the fluid to escape through the respective opening 52,54.

Having thus described various embodiments of the invention, what is claimed as new and desired to be protected by Letters Patent includes the following:

1. An apparatus for preventing ice blockage of a sump pump discharge line comprising:
    a housing having a hollowed interior and configured for mounting on a wall of a building, the housing including lower and upper openings formed in an externally facing wall of the housing;
    a discharge line connection segment at least partially housed in the housing and for fluidly coupling with the sump pump discharge line;
    an expeller segment at least partially housed in the housing and including lower and upper pipe segments in fluid communication with the discharge line connection segment, wherein the lower pipe segment is also in fluid communication with the lower opening in the housing, and the upper pipe segment is also in fluid communication with the upper opening in the housing; and
    a covering for at least partially covering the lower and upper openings in the housing, the covering being operable to be moved from an at rest position, wherein the lower and upper openings are at least partially covered, to an operating position, wherein one or both of the lower and upper openings are at least partially exposed so that fluid may be expelled from the exposed openings.

2. The apparatus of claim 1,
    wherein the housing comprises lower and upper end walls, left and right side walls, a front wall, and a rear wall,
    wherein the rear wall is proximal the wall of the building, and
    wherein the lower and upper openings are formed in the front wall.

3. The apparatus of claim 2, wherein the lower and upper openings in the housing are generally circular and are arranged along a longitudinal length of the housing.

4. The apparatus of claim 3, wherein a width of each opening in the housing is greater than or equal to approximately 65% the width of the housing.

5. The apparatus of claim 1, wherein the expeller segment includes a lower section and an upper section and the discharge line connection segment extends from the upper section and is in direct fluid communication with the upper section.

6. The apparatus of claim 5, wherein the expeller segment is generally U-shaped in vertical cross section and includes a generally horizontal lower leg, a generally horizontal upper leg, and a vertically oriented body disposed between the lower and upper legs.

7. The apparatus of claim 6, wherein the lower leg of the expeller segment includes a lower opening in fluid communication with the lower opening of the housing, and the upper leg of the expeller segment includes an upper opening in fluid communication with the upper opening of the housing.

8. The apparatus of claim 7,
    wherein in a first operating condition, the lower opening of the housing is not blocked by ice, such that fluid exiting the discharge line connection segment flows via gravity down and through the body of the expeller segment, to the lower leg of the expeller segment, and through the lower opening of the housing,
    wherein in a second operating condition, the lower opening of the housing is blocked by ice, such that fluid cannot escape the lower opening of the housing, and upon the lower opening of the housing being blocked, fluid exiting the discharge segment flows to the upper leg of the expeller segment and through the upper opening of the housing.

9. The apparatus of claim 1,
    wherein the covering includes lower and upper doors pivotably mounted to the housing,
    wherein the lower door is pivotable from an at rest position at least partially covering the lower opening in the housing, and to an operating position wherein the lower door is pivoted away from the lower opening in the housing, and
    wherein the upper door is pivotable from an at rest position at least partially covering the upper opening in the housing, and to an operating position wherein the upper door is pivoted away from the upper opening in the housing.

10. An apparatus for preventing ice blockage of a sump pump discharge line comprising:
    a housing having a hollowed interior and configured for mounting on a wall of a building, the housing including lower and upper openings formed in an externally facing wall of the housing;
    a discharge line connection segment at least partially housed in the housing and for fluidly coupling with the sump pump discharge line;
    a generally U-shaped expeller segment, the expeller segment comprising lower and upper legs and a body disposed between the legs and in fluid communication with the legs,
    wherein an upper section of the expeller segment is in fluid communication with the discharge line connection segment, the upper leg is in fluid communication with the upper opening in the housing, and the lower leg is in fluid communication with the lower opening in the housing; and
    a covering comprising lower and upper doors pivotably mounted to the housing,
    wherein the lower door is pivotable from an at rest position at least partially covering the lower opening in the housing, and to an operating position wherein the lower door is pivoted away from the lower opening in the housing, wherein the upper door is pivotable from an at rest position at least partially covering the upper opening in the housing, and to an operating position wherein the upper door is pivoted away from the upper opening in the housing, wherein in a first operating condition, the lower opening of the housing is not blocked by ice, such that fluid exiting the discharge segment flows via gravity down and through the body of the expeller segment, to the lower leg of the expeller segment, and through the lower opening of the housing, wherein in a second operating condition, the lower opening of the housing is blocked by ice, such that fluid cannot escape the lower opening of the housing, and upon the lower opening of the housing being blocked, fluid exiting the discharge segment flows to the upper leg of the expeller segment and through the upper opening of the housing.

11. The apparatus of claim 10, wherein the housing comprises lower and upper end walls, left and right side walls, a front wall, and a rear wall, wherein the rear wall is proximal the wall of the building, and wherein the lower and upper openings are formed in the front wall.

12. The apparatus of claim 11, wherein the lower and upper openings in the housing are generally circular and are arranged along a longitudinal length of the housing.

13. The apparatus of claim 12, wherein a width of each opening in the housing is greater than or equal to approximately 65% the width of the housing.

14. A method for preventing ice blockage of a sump pump discharge line comprising the steps of:

providing an ice blocking apparatus including— a housing having a hollowed interior and configured for mounting on a wall of a building, the housing including lower and upper openings formed in an externally facing wall of the housing, a discharge line connection segment at least partially housed in the housing and for fluidly coupling with the sump pump discharge line, an expeller segment at least partially housed in the housing and including lower and upper pipe segments in fluid communication with the discharge line connection segment, wherein the lower pipe segment is also in fluid communication with the lower opening in the housing, and the upper pipe segment is also in fluid communication with the upper opening in the housing, and a covering for at least partially covering the lower and upper openings in the housing;

fluidly coupling the discharge line connection segment with the sump pump discharge line; and mounting the housing on the wall of the building, wherein the covering is operable to be moved from an at rest position, wherein the lower and upper openings are at least partially covered, to an operating position, wherein one or both of the lower and upper openings are at least partially exposed so that fluid may be expelled from the exposed openings.

15. The method of claim 14, wherein the discharge line connection segment is fluidly coupled with the sump pump discharge line via a joint connector.

16. The method of claim 14, wherein the housing is mounted on the wall of the building via a fastener.

17. The method of claim 14, wherein the expeller segment is generally U-shaped in vertical cross section and includes a generally horizontal lower leg, a generally horizontal upper leg, and a vertically oriented body disposed between the lower and upper legs.

18. The method of claim 17, wherein the lower leg of the expeller segment includes a lower opening in fluid communication with the lower opening of the housing, and the upper leg of the expeller segment includes an upper opening in fluid communication with the upper opening of the housing.

19. The method of claim 18, wherein in a first operating condition, the lower opening of the housing is not blocked by ice, such that fluid exiting the discharge line connection segment flows via gravity down and through the body of the expeller segment, to the lower leg of the expeller segment, and through the lower opening of the housing, wherein in a second operating condition, the lower opening of the housing is blocked by ice, such that fluid cannot escape the lower opening of the housing, and upon the lower opening of the housing being blocked, fluid exiting the discharge segment flows to the upper leg of the expeller segment and through the upper opening of the housing.

20. The method of claim 14, wherein the covering includes lower and upper doors pivotably mounted to the housing, wherein the lower door is pivotable from an at rest position at least partially covering the lower opening in the housing, and to an operating position wherein the lower door is pivoted away from the lower opening in the housing, and wherein the upper door is pivotable from an at rest position at least partially covering the upper opening in the housing, and to an operating position wherein the upper door is pivoted away from the upper opening in the housing.

* * * * *